United States Patent
Sambale et al.

(10) Patent No.: US 11,282,395 B2
(45) Date of Patent: Mar. 22, 2022

(54) METHOD FOR OPERATING AN AUTOMATED VEHICLE CONVOY

(71) Applicant: Robert Bosch GmbH, Stuttgart (DE)

(72) Inventors: Klaus Sambale, Oberhausen (DE); Christian Zimmermann, Stuttgart (DE); Frank Hofmann, Hildesheim (DE); Soheil Gherekhloo, Lauffen Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 288 days.

(21) Appl. No.: 16/374,193

(22) Filed: Apr. 3, 2019

(65) Prior Publication Data
US 2019/0318632 A1    Oct. 17, 2019

(30) Foreign Application Priority Data
Apr. 17, 2018 (DE) .......... 102018205842.3

(51) Int. Cl.
| | |
|---|---|
| *G08G 1/00* | (2006.01) |
| *G08G 1/16* | (2006.01) |
| *H04W 4/46* | (2018.01) |
| *G05D 1/00* | (2006.01) |
| *G05D 1/02* | (2020.01) |
| *H04W 4/024* | (2018.01) |

(52) U.S. Cl.
CPC .......... *G08G 1/22* (2013.01); *G05D 1/0027* (2013.01); *G05D 1/0293* (2013.01); *G05D 1/0297* (2013.01); *G08G 1/161* (2013.01); *H04W 4/024* (2018.02); *H04W 4/46* (2018.02); *G05D 2201/0213* (2013.01)

(58) Field of Classification Search
CPC .......... G08G 1/22; G08G 1/161; H04W 4/46; H04W 4/024; H04W 4/023; H04W 4/48; G05D 1/0027; G05D 1/0293; G05D 1/0297; G05D 2201/0213; H04L 9/3236; H04L 9/0656
See application file for complete search history.

(56) References Cited

U.S. PATENT DOCUMENTS

| | | | | |
|---|---|---|---|---|
| 2013/0041567 A1* | 2/2013 | Yamashiro | ............ | B60W 30/16 701/96 |
| 2013/0079953 A1* | 3/2013 | Kumabe | .................. | G08G 1/22 701/2 |
| 2018/0319403 A1* | 11/2018 | Buburuzan | ..... | B60W 30/18163 |

(Continued)

FOREIGN PATENT DOCUMENTS

DE    102010008208 A1    8/2011

*Primary Examiner* — Aaron L Troost
(74) *Attorney, Agent, or Firm* — Norton Rose Fulbright US LLP; Gerard Messina

(57) ABSTRACT

A method for operating an automated vehicle convoy includes periodically wirelessly transmitting messages from preceding participants of the automated vehicle convoy to respective following participants of the automated vehicle convoy, proceeding from the leading participant of the automated vehicle convoy. The messages include at least one piece of, in particular temporal, information from which a minimum distance between each following participant and the respective preceding participant is ascertained. The following participants of the automated vehicle convoy are guided corresponding to the ascertained minimum distance.

18 Claims, 2 Drawing Sheets

(56) References Cited

U.S. PATENT DOCUMENTS

| | | | |
|---|---|---|---|
| 2019/0044728 A1* | 2/2019 | Karmoose | H04L 9/12 |
| 2019/0225142 A1* | 7/2019 | Switkes | B60Q 1/50 |
| 2019/0274017 A1* | 9/2019 | Wang | H04W 4/06 |

* cited by examiner

FIG. 3

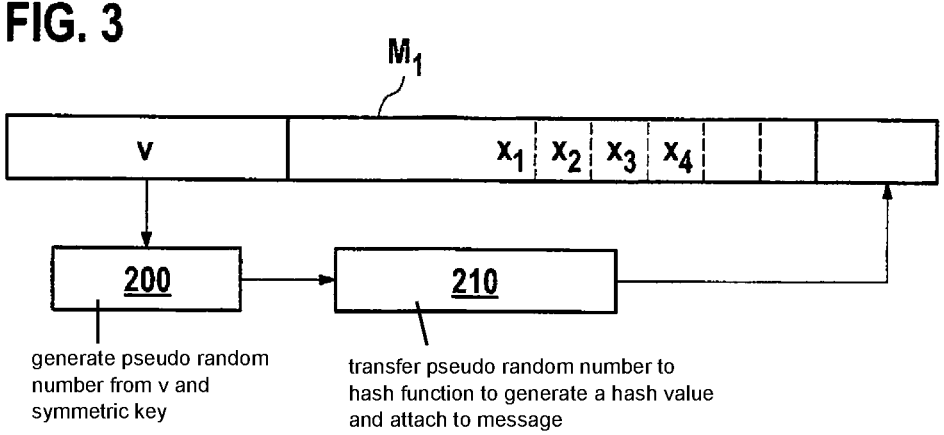

generate pseudo random number from v and symmetric key transfer pseudo random number to hash function to generate a hash value and attach to message

FIG. 4

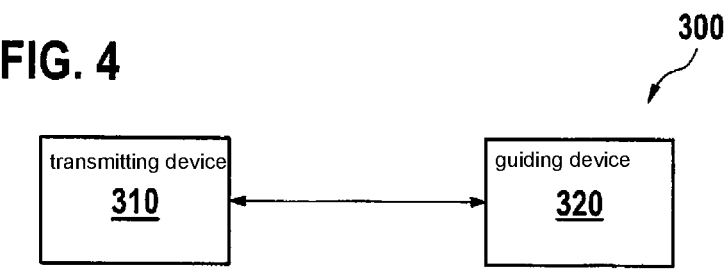

FIG. 5

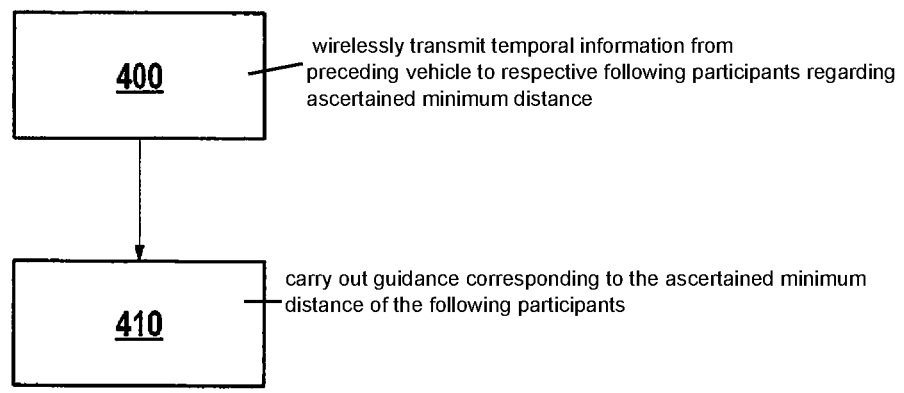

400 — wirelessly transmit temporal information from preceding vehicle to respective following participants regarding ascertained minimum distance 410 — carry out guidance corresponding to the ascertained minimum distance of the following participants

METHOD FOR OPERATING AN AUTOMATED VEHICLE CONVOY

CROSS REFERENCE

The present application claims the benefit under 35 U.S.C. § 119 of German Patent Application No. DE 102018205842.3 filed on Apr. 17, 2018, which is expressly incorporated herein by reference in its entirety.

FIELD

The present invention relates to a method for operating an automated vehicle convoy. The present invention furthermore relates to a device for operating an automated vehicle convoy. The present invention furthermore relates to a computer program product.

BACKGROUND INFORMATION

Conventional systems include systems in which vehicles form automated convoys ("vehicle platoons"), in particular on expressways. Vehicles gather behind one another in the process and drive at close distances over limited periods of time at a uniform speed. The coordination for forming, maintaining and dissolving a vehicle platoon takes place with the aid of vehicle-to-vehicle communication. Conventional approaches allow, with the aid of vehicle-to-vehicle communication, all vehicles in the platoon to start or stop together (jam-platoon with shared longitudinal control). This results in a strong improvement in the flow of traffic and in the potential to disperse existing congestions more quickly. The shared driving in the platoon may furthermore save fuel and avoid rear-end collisions.

With the aid of the platooning, it is possible to achieve significant fuel savings. For this purpose, the vehicles must drive so closely in succession that they must be coupled to one another via an "electronic drawbar," i.e., must communicate with one another in real time, e.g., for the transmission of steering and brake signals.

German Patent Application No. DE 10 2010 008 208 A1 describes a method for preventing collisions between vehicles, an emergency brake application of one vehicle being mitigated if a collision with the following vehicle is imminent.

SUMMARY

It is an object of the present invention to provide an improved method for operating an automated vehicle convoy.

According to a first aspect of the present invention, the object may be achieved by an example method for operating an automated vehicle convoy, including the steps:
periodically wirelessly transmitting messages from preceding participants of the automated vehicle convoy to respective following participants of the automated vehicle convoy, proceeding from the leading participant of the automated vehicle convoy;
the messages including at least one piece of, in particular temporal, information from which a minimum distance between each following participant and the respective preceding participant is ascertained;
the following participants of the automated vehicle convoy being guided corresponding to the ascertained minimum distance.

In this way a method is provided in which each platoon participant knows how long he or she may continue to drive within the automated vehicle convoy. A so-called "time stamp" is used in the process to transmit the necessary pieces of information. In this way, a defined distance may be provided between the vehicles, which in some circumstances is even below a minimum distance prescribed by law between the vehicles of the automated vehicle convoy. This is achieved by a cyclical unidirectional flow of information, proceeding from the leading vehicle to the rear and starting from the leading vehicle again.

According to a second aspect of the present invention, the object may be achieved by an example device for the optimized operation of an automated vehicle convoy, including:
a transmitting device for periodically wirelessly transmitting messages from preceding participants of the automated vehicle convoy to respective following participants of the automated vehicle convoy, proceeding from the leading participant of the automated vehicle convoy;
the messages including at least one piece of, in particular temporal, information from which a minimum distance between the following participant and the respective preceding participant is ascertained; and
a guiding device for guiding the participants of the automated vehicle convoy corresponding to the ascertained minimum distance.

A guiding of a participant of the automated vehicle convoy may be understood to mean a control of a drive unit or a brake unit of the participant to adapt or set a spatial distance from a preceding participant.

Advantageous refinements of the example method according to the present invention are described herein.

One advantageous refinement of the example method according to the present invention provides that the following participants may only evaluate messages transmitted by the directly preceding participant. In this way, a safety level is advantageously enhanced by a "hop by hop communication" since each involved vehicle, upon receipt of a message, knows that all preceding vehicles have received the respective message of the vehicle preceding them within the same periodic passage or, expressed in more general terms, that all preceding vehicles have received valid messages.

One further advantageous refinement of the example method according to the present invention provides that the piece of, in particular temporal, information includes at least one of the following pieces of information: stopping distances of the participants, uncertainty of stopping distances of the participants, differences in the stopping distances of the participants, validity or validity period of the message, distance which the follower may maximally drive during the validity of the message, braking profiles of the participants, response time of the brakes of the participants. Optional attributes are thereby transmitted, which may further improve an automated operation of the automated vehicle convoy.

One further advantageous refinement of the example method according to the present invention provides that the message cannot be undone by the transmitting participants. This prevents the event that, in some circumstances, the undone messages are not received, whereby in some instances collisions occur between the participants.

One further advantageous refinement of the example method according to the present invention provides that the message is transmitted again, or a new message is transmitted, by the preceding participant in the event that the message was not received by the following participant.

One further advantageous refinement of the example method according to the present invention is characterized in that time intervals at which messages are transmitted are shorter than a validity period of the piece of, in particular temporal, information contained therein. In other words, this means that a time interval between the sending or transmission of two chronologically consecutive messages is smaller than the validity period of the information contained therein. A safety level is also advantageously increased in this way since not every message is necessarily required to continuously maintain the driving operation of the automated vehicle convoy. As a result, a further safety measure is thereby implemented.

One further advantageous refinement of the example method according to the present invention provides that pieces of information regarding the number of participants of the automated vehicle convoy are transmitted in the messages. In this way a simple principle is implemented, with the aid of which a length of the automated vehicle convoy is limitable, a counter is incremented by one in each case by each participant.

One further advantageous refinement of the example method according to the present invention provides for the messages to be signed in a defined manner. In other words, this means that the messages may be unambiguously assigned to a participant transmitting the message or sending the message. In this way, a security of the message exchange between the participants of the automated vehicle convoy is further increased.

One further advantageous refinement of the example method according to the present invention provides that a pseudo random number, which is transferred to a hash function, is generated with the aid of the pieces of temporal information and a symmetric key, a result of the hash function being attached to the message. A hash function may be understood to mean a function which maps a larger input set onto a smaller target set. In this way, simple measures of conventional cryptography which are efficient in terms of time are applied to still further increase the security of the message transmission between the participants of the automated vehicle convoy.

One further advantageous refinement of the example method according to the present invention provides that the hash function is resistant against length extension attacks. For example, the hash function may be a conventional SHA3 function which is resistant against so-called length extension attacks. In this way, it is advantageously supported that false messages, manipulation attempts and transmission errors may be identified. Transmission errors caused e.g., by a disrupted transmission channel may also be identified by hash functions which are not resistant against length extension attacks.

The present invention is described in greater detail hereafter with further features and advantages based on several figures. All described or illustrated features, either alone or in any arbitrary combination, form the subject matter of the present invention, regardless of the wording or representation thereof in the description or in the figures.

BRIEF DESCRIPTION OF THE DRAWINGS

FIG. 3 shows a schematic representation of a method for signing messages between the participants of the automated vehicle convoy.

FIG. 4 shows a schematic block diagram of a device for operating an automated vehicle convoy.

FIG. 5 shows a schematic sequence of one specific embodiment of the provided method for operating an automated vehicle convoy.

DETAILED DESCRIPTION OF EXAMPLE EMBODIMENTS

Hereafter, the term 'automated vehicle' is used synonymously to mean semi-automated vehicle, autonomous vehicle and semi-autonomous vehicle.

In particular, it is a core aspect of the present invention to provide an improved method and a device for operating an automated vehicle convoy.

Automated vehicle convoys ("platoons") are generally made up of multiple, functionally coupled vehicles which follow in close succession and are operated in an automated manner. It is provided to minimize distances between the participants of the automated vehicle convoy in such a way that minimum distances between the participants of the automated vehicle convoy are considerably shorter than stopping distances. The distances are at least as large as the differences in the stopping distances of participants driving in succession. This is necessary, in particular, for high density vehicle platooning in which the participants drive at minimal distances from one another to reduce fuel consumption and increase driving efficiency.

With the provided method, it is advantageously possible to provide a safe driving operation also in the case of an unexpected interruption in communication between the participants of the automated vehicle convoy.

The present invention provides a unidirectional message flow between the participants of the automated vehicle convoy, messages being transmitted in each case from preceding participants to the following participants of the automated vehicle convoy.

Figure 1:
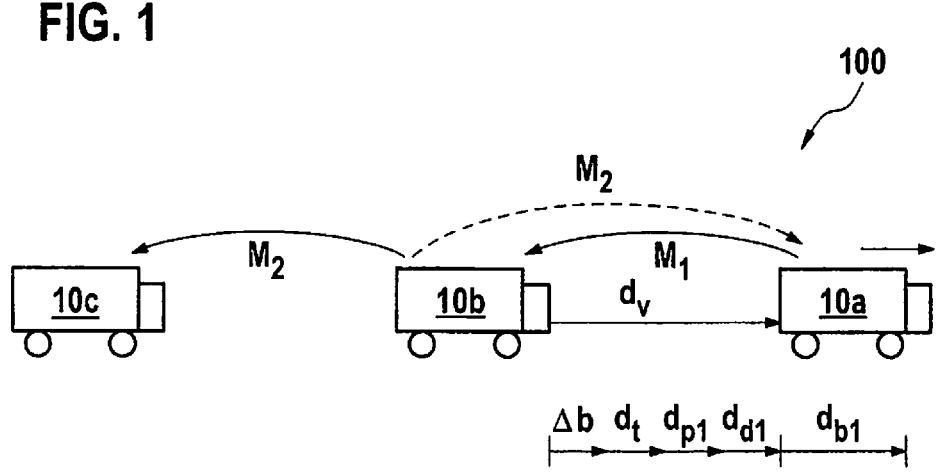
FIG. 1 shows a schematic representation of an operating mode of one specific embodiment of a provided method for operating an automated vehicle convoy.

FIG. 1 shows a principle of such a message flow. An automated vehicle convoy 100 including three participants 10a, 10b and 10c is apparent. Participant 10a represents the leading vehicle of automated vehicle convoy 100, participant 10b following participant 10a at a distance $d_v$ ("minimum distance"), which is shorter than is usually provided for safe driving. The distances and message flows described hereafter are described by way of example for participants 10a, 10b, but apply analogously also to all further participants of automated vehicle convoy 100. The number three used to describe the participants of automated vehicle convoy 100 in FIG. 1 is only by way of example, of course.

To ensure safe stopping in the event of an emergency brake application, participant 10a transmits periodic messages M1 to participant 10b which each include at least one "time stamp" defining a validity period of the message of participant 10a. In this way, participant 10b knows the distance he or she has available in the event of an emergency braking maneuver of participant 10a, in addition to minimum distance $d_v$.

The described messages are thus transmitted, proceeding from participant 10a, in a chain-like manner from one participant of automated vehicle convoy 100 to the next ("from the front to the rear"). In principle, however, it is also possible that following participants generate the messages at a different frequency and at different points in time. It is thus only necessary that the time stamps used in the messages and, if necessary, further attributes are selected in such a way that the automated vehicle convoy is always in a safe state.

Hereafter, further optional pieces of information are described, which may be transmitted in addition to the above-mentioned information regarding the stopping distance.

Message $M_1$ may also include pieces of information regarding a driving distance $d_{d1}$ (e.g., in the form of a distance dimension, a piece of temporal information, a geo position, etc.) and a time stamp $t_1$, which preferably defines an absolute point in time in the future. In the simplest case, driving distance $d_{d1}$ may be calculated from the instantaneous speed and the time until time stamp $t_1$ is reached. A transmission of relative times of participants $10a$, $10b$ would also be conceivable here. These two parameters determine the maximum distance which participant $10b$ may drive until the time of time stamp $t_1$ has been reached. If no new message including a new time stamp which is in the future was received by the expiration of this time stamp $t_1$, a procedure must be initiated to maintain a safe driving state without communication between participants $10a$, $10b$, e.g., in the form of an initiation of an emergency brake application.

In the event that the time of time stamp $t_1$ has been reached, but the distance between participants $10a$, $10b$ is shorter than $d_{d1}$, participant $10b$ is not permitted to continue driving, so that participant $10b$ has to initiate a procedure to maintain the safe driving state. $d_{d1}$ thus represents an optional attribute, with the aid of which changing speeds of participant $10a$ may be taken into consideration better by participant $10b$.

Stopping distance $d_{b1}$ thus represents an optional attribute to be able to respond better to a driving behavior of the preceding driver. Pieces of information regarding stopping distance $d_{b1}$ may be designed e.g., as a piece of distance information, a piece of temporal information, a piece of information including absolute coordinates, etc.

In this way, the two described optional parameters $t_1$, $d_{d1}$ define an upper, average speed limit for participant $10b$.

Based on the described three parameters $d_{b1}$, $t_1$ and $d_{d1}$, participant $10b$ is able to ascertain minimum driving distance $d_v$. Initially, participant $10b$ ascertains his or her own stopping distance $d_{b2}$ (not shown). In the event that $$\Delta_b = d_{b2} - d_{b1}$$

$d_{b1}$ ... stopping distance of participant $10a$
$d_{b2}$ ... stopping distance of participant $10b$
is positive, this difference must be taken into consideration in the calculation of driving distance $d_v$ to depict the longer necessary stopping distance.

In the event that $$\Delta_b = d_{b2} - d_{b1}$$

is negative, difference $\Delta_b$ does not reduce the necessary minimum driving distance $d_v$ since the shorter stopping distance of participant $10b$, compared to that of participant $10a$, is not counted at the beginning of the braking process; in this case, difference $\Delta_b$ is thus set to zero.

Dead times and a variance in the brake application sensitivity of the host braking system are converted into a distance $d_t$, based on the speed of participant $10b$. This distance $d_t$ may also be taken into consideration in the ascertainment of minimum driving distance $d_v$ and may be transmitted as an optional piece of information in message $M_1$. The deceleration of participants $10a$, $10b$ takes place according to a defined temporal braking profile, e.g., when participant $10b$ during an emergency braking maneuver brakes less strongly than participant $10a$ for a certain time. The distance between two participants $10a$, $10b$ may not be sufficient to avoid a collision.

For this reason, either a fixed braking profile may be taken into consideration for all participants, or participant $10a$ may describe his or her potential braking profile using parameters which are added to the periodically transmitted messages as optional parameters. Optionally, a degree to which an accuracy of the braking profile is uncertain may also be added to the messages, e.g., in the form of a maximum deviation from the braking profile.

Based on this information, participant $10b$ may calculate an additional safety distance $d_{p1}$ to compensate for this uncertainty. In the last step, distance $d_{d1}$ may be taken into consideration in the calculation of minimum driving distance $d_v$. This is necessary for the following reasons:

Participant $10b$ is allowed to drive distance $d_{d1}$ until the expiration of time stamp $t_1$. If participant $10b$ does not receive a new message $M_1'$ (not shown), including a new time stamp $t_1' > t_1$ and a new distance $d_{d1}' > 0$ prior to the expiration of time stamp $t_1$, he or she must initiate a procedure to maintain the safe driving state, e.g., in the form of an emergency braking maneuver at point in time $t_1$.

If, for some reason, no pieces of information are able to be transmitted from participant $10a$ to participant $10b$, after message $M_1$ was sent and participant $10a$ has initiated the procedure for maintaining a safe driving state at point in time $t_0$ at which message $M_1$ was sent, participant $10b$ starts a procedure for maintaining a safe driving state at point in time $t_1 > t_0$. During time interval $t_1 - t_0$, participant $10b$ drove up to distance $d_{d1}$, therefore this value must be considered in the calculation of minimum driving distance $d_v$.

Minimum driving distance $d_v$ is then ascertained as follows:

$$d_{vmin} = \Delta_b + d_t (+ d_{p1}) + d_{d1}$$

Value $d_{p1}$ is provided in parentheses since it is optional.

To enable a uniform driving operation of automated vehicle convoy $100$, participant $10a$ thus periodically transmits new messages, each including an increased time stamp. Respective increased time stamps are only utilized when the time stamps include pieces of absolute time information. The time stamps do not necessarily increase in the case of pieces of relative time information.

This preferably provides a transmission of new messages at a higher frequency than necessary so that a reliability is increased if messages are lost. In the event that following messages are lost, participant $10b$ initiates a procedure to maintain a safe driving state and may return to the customary procedure if new messages are received. To enable driving with short distances between participants at high speeds, a high transmission frequency of the message transmission is sought. The messages should be kept as short as possible.

Participant $10b$ also generates periodic messages $M_2$ for following participant $10c$. Messages $M_2$ include at the most the same time stamps and driving distances from one of the most recently received messages $M_1$ or alternatively time stamps which do not extend so far in to the future, with accordingly shorter driving distances. In this way, a safe state of the automated vehicle convoy may also be ensured in a simple manner in the event of a failure of the communication between the participants. However, a safe state of the automated vehicle convoy must also always be ensured with a suitable selection of time stamps by participant $10b$ which are greater than the time stamps in the messages received from participant 10a. In the event that $b_2$ (not shown) is greater than $b_1$, participant 10b sets the braking distance to $b_2$. In the event that $b_2$ is smaller than $b_1$, the messages may include braking distance $b_1$. On the other hand, however, participant 10b then has to adapt his or her braking force so that participant 10b comes to a standstill after distance $b_1$ and not after distance $b_2$.

All participants 10a ... 10n are now permitted to evaluate messages from the respective preceding participant, i.e., that participant 10b is only allowed to interpret messages $M_1$ of participant 10a, and participant 10c only those of participant 10b, but not messages of participant 10a.

This is necessary to provide a safe driving operation of automated vehicle convoy 100. In the event that the communication between participants 10a, 10b is interrupted, participant 10c initiates a procedure for achieving a safe driving state after the last time stamp of received messages $M_1$ was reached.

In the event that participant 10c does not receive any messages including newer time stamps from participant 10b, he or she will conclude that participant 10b has initiated a procedure for achieving a safe driving state. In this case, participant 10c initiates a procedure for achieving a safe driving state to prevent a potential collision with participant 10b, even if he or she is able to receive messages $M_1$ of participant 10a. In the event that only the communication between participants 10b, 10c is disrupted, not however between participants 10a, 10b, participant 10c initiates the procedure for achieving a safe driving state, while participant 10b does not carry this out. During a possible braking maneuver, the distance between participants 10b, 10c increases continuously. If, during this braking maneuver, the distance between participants 10b, 10c becomes sufficiently large for participant 10c to come to a standstill, participant 10c may interrupt the braking process since now there is no need any longer to rely on pieces of information from participant 10b to come to a safe halt.

Figure 2:
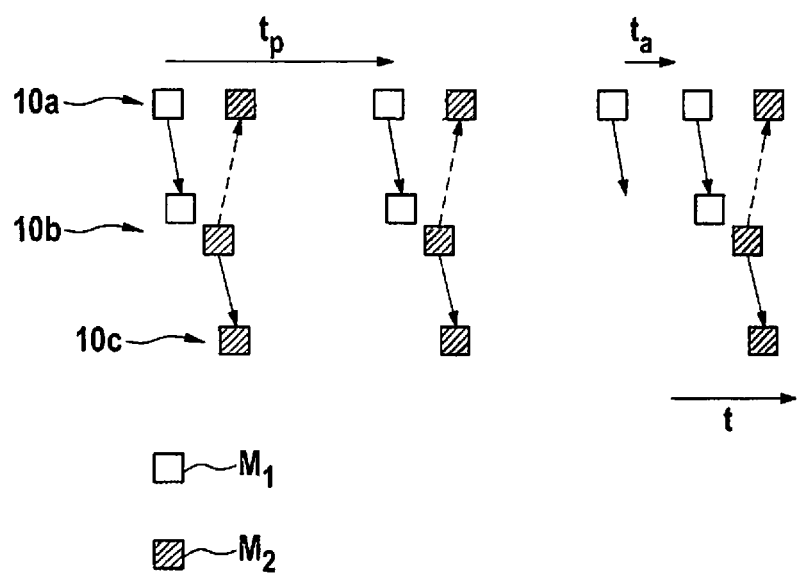
FIG. 2 shows a schematic representation of an operating mode of one improved specific embodiment of the provided method for operating an automated vehicle convoy.

Optionally, participant 10a may listen in on messages transmitted from participant 10b to participant 10c and initiate a repeat transmission of messages $M_1$ if he or she has not received any messages $M_2$ after a defined short time interval $t_a$ to deal with a possible loss of information of messages $M_1$ during the initial transmission, as is indicated in FIG. 2 in principle. Participant 10a may repeat his or her transmission procedure multiple times to thereby increase the likelihood of a correct reception of the messages by participant 10b. He or she may use repetition mechanisms (chase combining) to increase the likelihood of a correct reception of the message by participant 10b.

This repetition mechanism does not need to be negotiated between participants 10a, 10b. Participant 10b may automatically initiate this mechanism when he or she receives first message $M_2$ and may end this mechanism when he or she does not receive any messages $M_2$ even after multiple re-transmission attempts.

All messages $M_1$ ... $M_n$ are preferably cryoptographically signed to ensure that they were sent by the expected participant 10a ... 10n. Since the messages include absolute time stamps, they are immune to replay attacks. In contrast, a re-transmission of messages carried out by whomever may increase the reliability of the overall system. In the event that a defined number of participants is to be present in automated vehicle convoy 100, a participant counter may also be included, which may be attached to every message. Each participant increments this participant counter, compared to the message that he or she received, so that, in this way, participant 10a has participant counter content "0," participant 10b has participant counter content "1" etc. Based on a fixed or a scenario-dependent maximum participant counter, every participant is able to ascertain whether he or she is entitled to receive messages from participants to calculate therefrom a certain minimum driving distance $d_v$. If the counter content of the participant counter is greater than or equal to the entire counter content of all received messages, further messages should be ignored, whereby a sufficient distance from the preceding participant is adhered to, without relying on pieces of information which were transmitted from the preceding participant.

FIG. 3 shows such a schematic method, which is conventional, for providing an integrity of messages, which may be utilized to transmit the above-mentioned messages $M_1$ ... $M_n$. An exemplary message $M_1$ having a value v, which increases strictly monotonically in the next message, is apparent. In a step 200, a pseudo random number is generated from value v together with a symmetric key. In a further step 210, this pseudo random number is transferred to a hash function for generating a hash value, this hash value being attached to message $M_1$. The individual optional parameters x1 ... x4 within message $M_1$ are apparent, which are also transferred to the hash function so that their integrity may also be checked.

Compared to asymmetric cryptography methods, the use of symmetric cryptographic methods is advantageous since they are particularly efficient and thereby time-efficient.

The provided mechanism proposes a unidirectional communication, i.e., that one unit only sends and one unit only receives. In a defined step, a shared key is negotiated between the sender and the recipient. For example, the sender may utilize the public key of the recipient to encrypt a locally generated pseudo random number and transmit it to the recipient, who is able to decrypt the key using his or her private key. A bidirectional communication may also be used for negotiating the shared key, only the exchange of messages $M_1$ ... $M_n$ taking place unidirectionally. In a step 200, the pseudo random number is calculated with the aid of the private key and value v.

In a further step 210, the generated key is used by the sender within the signing process. Each message to be transmitted includes a strictly monotonically increasing value v, e.g., in the form of above-mentioned time stamp $t_1$. As an alternative, value v may also be strictly monotonically decreasing. In any case, the described monotonicity should not change when the mechanism is impaired. Function f uses the secret key and value v as inputs and depicts an output value in the form of a pseudo random number. An exemplary function having the required features may be a shift register. The secret key is used to initialize the shift register, the shift register being shifted for each value v by the number of bits representing the pseudo random number. It is useful to define a fixed minimum increment and to generate a pseudo random number for each value, i.e., for 1, 2, 3, 4, 5, 6, etc., for example. Depending on value v, only a subset of the generated pseudo random numbers is then used, i.e., for 10, 15, 20, 30, 40, for example.

The pseudo random number is generated together with the shared parameters $x_1$ ... $x_n$ with the aid of a cryptographically safe hash function, which is resistant against length extension attacks, e.g., in the form of a SHA3 function. Optionally, value v may also be included in the hash process. The generated hash value is attached to message $M_1$, and thereafter message $M_1$ is transmitted. Optionally transmitted attributes, such as the length of the stopping distance, also have to be transferred to the hash function to be able to ensure their integrity. Upon receipt of message $M_1$, the recipient carries out the same operations as the sender and compares the resulting hash value. If the two hash values agree, the integrity of message $M_1$ is confirmed.

The hash value fulfills three different purposes:

First, it allows an unambiguous identification of the sender. Since only the sender and the recipient know the shared key, the recipient may be certain from whom the message stems, as long as it is ensured that it was not generated by himself or herself. The sender may decline being the author of a message since it could potentially also have been generated by the recipient. Depending on the respective scenario in which the encryption mechanism is used, however, this is not problematic and is inherent to symmetric cryptography.

Secondly, it is possible to detect transmission errors since, in general, the calculated hash value thus deviates from the hash value transmitted in the message. In this case, the hash value assumes the same functionality as a cyclic redundancy check (CRC).

Thirdly, the hash value ensures that intended changes to the message content by a third party are reliably detected. Since the shared secret key is not known to a third party, this third party is not able to calculate the correct hash value for a modified message.

By storing value v of the most recently received message and comparing it to value v of the present message, replay attacks may be identified in a simple manner since value v of the present message must be greater (if v is strictly monotonically increasing) or smaller (if v is strictly monotonically decreasing). The secret key may be used to sign many messages as long as the pseudo random numbers are not repeated, e.g., the output of the shift register has a limited period length in which it starts to output the same sequences again, and as long as the value range of v is not exhausted.

When one of the two conditions is met, a new key has to be negotiated between the sender and the recipient since otherwise replay attacks could be successful. If one or multiple message(s) is/are lost during the communication, the recipient is always able to check the integrity of subsequent messages since value v allows it to be synchronized with the sender of accordingly generated pseudo random numbers.

For the described reasons, this mechanism is better suited for unidirectional communication. If a bidirectional communication is to be used, it is recommended to provide two unidirectional communication channels, one for each direction. This includes the sharing of two secret keys and the monitoring of two independent, strictly monotonic values.

FIG. 4 shows a block diagram of a device for operating an automated vehicle convoy 100. A transmitting device 310 is apparent for periodically wirelessly transmitting messages $M_1 \ldots M_n$ from preceding participants of automated vehicle convoy 100 to respective following participants of automated vehicle convoy 100, proceeding from leading participant 10a of automated vehicle convoy 100, messages $M_1 \ldots M_n$ including at least one piece of temporal information from which a minimum distance $d_v$ between the following participant and the respective preceding participant is ascertained. A guiding device 320, which is functionally connected to transmitting device 310, for guiding the participants of automated vehicle convoy 100 corresponding to the ascertained minimum distance is also apparent. The described units are designed as electronic control units or parts thereof, for example.

FIG. 5 shows a schematic sequence of a method for operating an automated vehicle convoy 100.

In a step 400, a periodic wireless transmission of messages $M_1 \ldots M_n$ from preceding participants $10a \ldots 10n$ of automated vehicle convoy 100 to respective following participants $10b \ldots 10n$ of automated vehicle convoy 100 proceeding from leading participant 10a of automated vehicle convoy 100 is carried out, messages $M_1 \ldots M_n$ including at least one piece of temporal information from which a minimum distance $d_v$ between each following participant $10b \ldots 10n$ and the respective preceding participant $10a \ldots 10n$ is ascertained.

In a step 410, a guidance of following participants $10b \ldots 10n$ of automated vehicle convoy 100 corresponding to the ascertained minimum distance $d_v$ is carried out.

Advantageously, the method according to the present invention may be implemented as software which runs on electronic device 300, for example. This supports an easy adaptability of the method.

Those skilled in the art will suitably modify the features of the present invention and/or combine them with one another, without departing from the core of the present invention.

What is claimed is:

1. A method for operating an automated vehicle convoy, comprising:
   periodically wirelessly transmitting messages from preceding participants of the automated vehicle convoy to respective following participants of the automated vehicle convoy, proceeding from a leading participant of the automated vehicle convoy, the messages including at least one piece of temporal information from which a minimum distance between each following participant and the respective preceding participant is ascertained; and
   guiding the following participants of the automated vehicle convoy based on the ascertained minimum distance;
   wherein any one or more of the following features (a)-(c):
   (a) time intervals at which the messages are transmitted are shorter than the validity period of the respective message or of the piece of temporal information contained in the respective message;
   (b) a pseudo random number is generated using the at least one piece of temporal information and a symmetric key, the generated pseudo random number is transferred to a hash function, and a result of the hash function is attached to the messages; and
   (c) the messages include an indication of a degree of inaccuracy of a braking profile of a transmitter of the messages.

2. The method as recited in claim 1, wherein the following participants may only evaluate messages transmitted by the directly preceding participant.

3. The method as recited in claim 1, wherein the piece of temporal information includes at least one of the following pieces of information: stopping distances of the participants, uncertainty of stopping distances of the participants, differences in the stopping distances of the participants, validity of the message, distance which the follower may maximally drive during the validity of the message, braking profiles of the participants, response time of the brakes of the participants.

4. The method as recited in claim 1, wherein the messages cannot be undone by the transmitting participants.

5. The method as recited in claim 1, wherein in the event that a message was not received by the following participant, the message is transmitted again, or a new message is transmitted, by the preceding participant.

6. The method as recited in claim 1, wherein the time intervals at which the messages are transmitted are shorter than the validity period of the piece of temporal information contained therein.

7. The method as recited in claim 1, wherein pieces of information regarding a number of participants of the automated vehicle convoy are transmitted in the messages.

8. The method as recited in claim 7, wherein the receiver of the messages is configured to determine whether the receiver can join the automated vehicle convoy based on the pieces of information regarding the number of participants of the automated vehicle convoy.

9. The method as recited in claim 1, wherein the messages are signed in a defined manner.

10. The method as recited in claim 9, wherein the pseudo random number, which is transferred to the hash function, is generated with the aid of the pieces of temporal information and the symmetric key, the result of the hash function being attached to the messages.

11. The method as recited in claim 10, wherein the hash function is resistant against length extension attacks.

12. The method as recited in claim 1, wherein each respective one of the messages includes an identification of a validity period of the respective message or of the piece of temporal information contained in the respective message.

13. The method as recited in claim 1, wherein the time intervals at which the messages are transmitted are shorter than the validity period of the respective message or of the piece of temporal information contained in the respective message.

14. The method as recited in claim 1, wherein the pseudo random number is generated using the at least one piece of temporal information and the symmetric key, the generated pseudo random number is transferred to the hash function, and the result of the hash function is attached to the messages.

15. The method as recited in claim 1, wherein, for each respective one of the messages, the at least one piece of temporal information of the respective message includes a timestamp of a future time later than a moment at which the respective message was generated.

16. The method as recited in claim 1, wherein the messages include the indication of the degree of inaccuracy of the braking profile of the transmitter of the messages.

17. A device of a following participant vehicle of an automated vehicle convoy, the device comprising:
  a receiver;
  a processor communicatively coupled to at least one of a brake system and a drive system of the following participant vehicle;
  wherein:
    the device is configured to receive, via the receiver, messages that are periodically wirelessly transmitted from a preceding participant of the automated vehicle convoy, proceeding from a leading participant of the automated vehicle convoy, the messages including at least one piece of temporal information from which a minimum distance between the following participant vehicle and the preceding participant is ascertained;
    the processor is configured to control the at least one of the brake system and the drive system to guide the following participant vehicle based on the ascertained minimum distance; and
    any one or more of the following features (a)-(c):
      (a) time intervals at which the messages are transmitted are shorter than the validity period of the respective message or of the piece of temporal information contained in the respective message;
      (b) a pseudo random number is generated using the at least one piece of temporal information and a symmetric key, the generated pseudo random number is transferred to a hash function, and a result of the hash function is attached to the messages; and
      (c) the messages include an indication of a degree of inaccuracy of a braking profile of a transmitter of the messages.

18. A non-transitory computer-readable data carrier on which is stored a computer program including program code for operating an automated vehicle convoy, the computer program, when executed by an electronic device, causing the electronic device to perform:
  periodically wirelessly transmitting messages from preceding participants of the automated vehicle convoy to respective following participants of the automated vehicle convoy, proceeding from a leading participant of the automated vehicle convoy, the messages including at least one piece of temporal information from which a minimum distance between each following participant and the respective preceding participant is ascertained; and
  guiding the following participants of the automated vehicle convoy based on the ascertained minimum distance;
  wherein any one or more of the following features (a)-(c):
    (a) time intervals at which the messages are transmitted are shorter than the validity period of the respective message or of the piece of temporal information contained in the respective message;
    (b) a pseudo random number is generated using the at least one piece of temporal information and a symmetric key, the generated pseudo random number is transferred to a hash function, and a result of the hash function is attached to the messages; and
    (c) the messages include an indication of a degree of inaccuracy of a braking profile of a transmitter of the messages.

* * * * *